United States Patent
Sekiguchi et al.

(10) Patent No.: US 6,764,789 B1
(45) Date of Patent: Jul. 20, 2004

(54) REDOX FLOW BATTERY

(75) Inventors: Sumie Sekiguchi, Ibaraki (JP); Kouichi Furusato, Ibaraki (JP); Mitsutaka Miyabayashi, Ibaraki (JP); Kanji Satou, Ibaraki (JP); Toshihiko Tanimoto, Ibaraki (JP); Shouzou Naitou, Ibaraki (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 322 days.

(21) Appl. No.: 09/831,910
(22) PCT Filed: Sep. 20, 2000
(86) PCT No.: PCT/JP00/06439

§ 371 (c)(1),
(2), (4) Date: May 25, 2001

(87) PCT Pub. No.: WO01/24301

PCT Pub. Date: Apr. 5, 2001

(30) Foreign Application Priority Data

Sep. 27, 1999 (JP) ............................................. 11-273343

(51) Int. Cl.[7] ................................................ H02M 4/36
(52) U.S. Cl. .......................... 429/105; 429/72; 429/73; 429/74; 429/81
(58) Field of Search ........................... 429/101, 74, 72, 429/73, 81, 51, 105

(56) References Cited

U.S. PATENT DOCUMENTS 5,318,865 A * 6/1994 Kaneko et al. ............. 429/193

5,759,711 A   6/1998 Miyabayashi et al.

FOREIGN PATENT DOCUMENTS

| JP | 61-1270   | 1/1986 |           |
|----|-----------|--------|-----------|
| JP | 4-124754  | 11/1992 |          |
| JP | 7-211347  | * 8/1994 | .......... H01M/10/36 |
| JP | 8-138716  | 5/1996 |           |
| JP | 11-204124 | 7/1999 |           |

OTHER PUBLICATIONS

JP 11-204124 A, translation.*

* cited by examiner

*Primary Examiner*—Patrick Ryan
*Assistant Examiner*—Julian Mercado
(74) *Attorney, Agent, or Firm*—McDermott Will & Emery LLP

(57) ABSTRACT

The present invention provides a redox flow type battery which a liquid-circulating battery comprising a battery cell and storage tanks for positive and negative electrolytes, wherein the battery cell is separated by a membrane to provide a positive cell and a negative cell, each cell having a liquid-permeable porous electrode disposed therein, wherein the positive and negative electrolytes are sulfuric acid aqueous solutions with vanadium ion concentrations of 0.5 mol/l to 8 mol/l and the electrolyte which migrates through the membrane over cycles of charge and discharge is returned from the storage tank where the liquid increases to the storage tank where the liquid decreases in order to keep the change in the amounts of the positive and negative electrolytes in a certain range while charge and discharge are carried out.

8 Claims, 1 Drawing Sheet

REDOX FLOW BATTERY

TECHNICAL FIELD

The present invention relates to a redox flow secondary battery useful for electricity storage and the like, more specifically to a redox flow secondary battery which is capable of long-term continuous operation and stable electricity storage.

BACKGROUND ART

Nowadays, atmospheric carbon dioxide concentration is substantially increasing due to massive consumption of fossil fuels and, consequently, global warming has become a serious problem. This problem has provided an impetus to the development of solar batteries as sources of clean energy. However, since solar batteries cannot generate electricity at night and in wet weather, high performance secondary batteries to be used in combination with solar batteries have been strongly needed.

On the other hand, conventional power plants are required to have generating capacities which meet the highest demands, suffering from a big difference in electricity demands between night and day, which decreases the operating rate of the power plants. Therefore, it is necessary to level out the operation load by storing electric power at night in large-sized electricity storage batteries and supplying the electric power in the day time to increase the operating rate of the power plants to enable effective operation. For this purpose, the development of large-sized electricity storage batteries is required. In addition, the development of a secondary battery with a higher energy density suitable as a power source for movable bodies such as electric vehicles is also required.

Redox flow secondary batteries are a promising candidate for a new secondary battery suitable for the above-mentioned applications because they can be charged flexibly matching with the output voltage of a solar battery by tapping (a method of using only necessary units out of many cell units depending on the demand) and have a relatively simple structure permitting upsizing.

A redox flow secondary battery uses liquid battery active materials and the positive and negative active materials are circulated in liquid-permeable electrolytic cells, where an oxidation-reduction reaction occurs which enables charge and discharge. Redox flow secondary batteries have the following advantages over conventional secondary batteries.

(1) It is possible to increase the storage capacity simply by increasing the volume of the storage tanks and the amount of the active materials and the electrolytic cell itself can be used without modification unless the output is increased.

(2) Redox flow secondary batteries have the positive and negative active materials stored completely separately in different containers, so there is a lesser possibility of self discharge than the batteries of other types in which two active materials are in contact with their corresponding electrodes.

(3) The charge and discharge reaction (electrode reaction) of active material ions entails only exchanging electrons on the surface of the liquid-permeable carbon porous electrodes used in the redox flow secondary batteries. Therefore, the active material components are not deposited on the electrodes unlike zinc ions in zinc-bromine batteries, meaning the cell reaction is simple.

Iron-chromium batteries, which are one of the redox flow secondary batteries that have been developed to date, have not yet become commercially practical due to the shortcomings of low energy density, and iron ion and chromium ion mixing through the ion exchange membrane.

Therefore, so-called 'all vanadium redox flow secondary batteries', which have both the positive and negative electrolytes comprised of vanadium, have been proposed (J. Electrochem. Soc., 133, 1057 (1986), Japanese Patent Application Publication Laid Open No.62-186473). These batteries have several advantages in that they have higher electromotive force and energy density than iron-chromium batteries; they can be easily regenerated by charging even if the positive and negative electrolytes are completely mixed through the membrane because the electrolytes are based on a single element; and the electrolytes can be completely closed without decreasing the battery capacity.

However, during the charge/discharge cycling of the all-vanadium redox flow batteries, as with other kinds of redox flow batteries, there is a preferential volumetric transfer, which is due to the transfer behavior of various ions and water as a solvent in the electrolytes migrating through the membrane, in either of the positive/or negative electrolyte. This leads to a significant decrease in the battery capacity.

In order to solve the problem, extremely tiresome procedures are required in which the electrolytes in the tanks for the positive and negative electrolytes are mixed to adjust the compositions and amounts of the electrolytes to the initial state for every certain cycle of charge and discharge, before charge and discharge are started again. This mixing procedure is extremely tiresome itself and has a shortcoming in that it needs additional electric power in order to prepare the mixed electrolyte, which is a mixture of tetravalent vanadium and trivalent vanadium, for providing tetravalent vanadium for the positive electrode and trivalent vanadium for the negative electrode before charge and discharge are started again, sacrificing a large quantity of electricity. For commercialization, the interval between mixing the electrolytes has to be lengthened and the frequency decreased as low as possible in order to enable long-term continuous operation.

DISCLOSURE OF INVENTION

In view of this situation, the inventors have intensively investigated how to prevent the decrease in the electric capacity due to the migration of the liquid accompanied by charge and discharge in vanadium redox flow type secondary batteries and how to decrease the frequency of the conventional mixing procedure as low as possible to enable long-term continuous operation and, as a result, completed the present invention.

Accordingly, the present invention provides a redox flow type secondary battery which is a type of a liquid-circulating battery comprising a battery cell and storage tanks for positive and negative electrolytes, wherein the battery cell is separated by a membrane to provide a positive cell and a negative cell, each cell having a liquid-permeable porous electrode disposed therein, and the positive and negative electrolytes are passed and circulated from the storage tanks for the positive and negative electrolytes to the positive and negative cells, respectively, to conduct an oxidation-reduction reaction to charge and discharge the battery, characterized in that the positive and negative electrolytes are sulfuric acid aqueous solutions with vanadium ion concentrations of 0.5 mol/l to 8 mol/l and the electrolyte which migrates through the membrane over cycles of charge and discharge is returned from the storage tank where the liquid increases to the storage tank where the liquid decreases through a pipe in order to keep the change in the amounts of the positive and negative electrolytes in a certain range while charge and discharge are carried out.

Furthermore, the present invention provides a redox flow type secondary battery, wherein the amount of the liquid in the storage tank where the liquid decreases over cycles of charge and discharge is set greater than that of the liquid in the other storage tank beforehand prior to the operation.

Furthermore, the present invention provides a redox flow type secondary battery, wherein the relationship between the amounts of the liquids in the storage tanks for the positive and negative electrolytes and the type of the membrane satisfies one of the conditions (a) to (c):

(a) The membrane is an anion exchange membrane and the amount of the liquid in the storage tank for the positive electrolyte is set greater than that of the liquid in the storage tank for the negative electrolyte;

(b) The membrane is a cation exchange membrane and the amount of the liquid in the storage tank for the negative electrolyte is set greater than that of the liquid in the storage tank for the positive electrolyte; or (c) The membrane is a multi-layered membrane obtained by laminating plural anion and cation exchange membrane layers and the amount of the liquid in the storage tank for either of the positive or negative electrolyte where the liquid decreases depending on the properties of the multi-layered membrane is set greater than that of the liquid in the other storage tank.

Furthermore, the present invention provides a redox flow type secondary battery, wherein the liquid level in the storage tank where the liquid increases over cycles of charge and discharge is set higher beforehand than that in the other tank and a liquid-refluxing pass is equipped for refluxing the liquid from the higher storage tank to the other tank with the aid of the gravity difference between the liquid levels.

Furthermore, the present invention provides a redox flow type secondary battery, wherein the relationship between the liquid levels in the storage tanks for the positive and negative electrolytes and the type of the membrane satisfies one of the conditions (1) to (3):

(1) The membrane is an anion exchange membrane and the liquid level in the storage tank for the negative electrolyte is set higher than that in the storage tank for the positive electrolyte;

(2) The membrane is a cation exchange membrane and the liquid level in the storage tank for the positive electrolyte is set higher than that in the storage tank for the negative electrolyte; or (3) The membrane is a multi-layered membrane obtained by laminating plural anion and cation exchange membrane layers and the liquid level in the storage tank for either of the positive or negative electrolyte where the liquid increases depending on the properties of the multi-layer membrane is set higher than that in the other storage tank.

Furthermore, the present invention provides an overflow type battery in which there is a difference between the liquid levels in the storage tanks for the positive and negative electrolytes and the liquid is refluxed with the aid of the gravity difference between the liquid levels, characterized in that the membrane is a multi-layered membrane obtained by laminating plural anion and cation exchange membrane layers, and the cation exchange membrane layer faces the positive cell, and the liquid level in the storage tank for the positive electrolyte is set higher than that in the storage tank for the negative electrolyte.

Furthermore, the present invention provides a battery wherein the positive and negative electrolytes are sulfuric acid aqueous solutions of vanadium, and the concentrations of sulfate ions in the electrolytes are 0.5 mol/l to 9.0 mol/l.

BRIEF DESCRIPTION OF THE DRAWINGS

In FIG. 1, 1A is a current-collecting electrode, 1B is a current-collecting electrode, 2 is a porous carbon electrode, 3 is a membrane, 4 is a spacer, 5 is a positive cell, 6 is a negative cell, Lp(in) is an inlet of the positive electrolyte, Lp(out) is an outlet of the positive electrolyte, Ln(in) is an inlet of the negative electrolyte, Ln(out) is an outlet of the negative electrolyte.

BEST MODE FOR CARRYING OUT THE INVENTION

Figure 1:
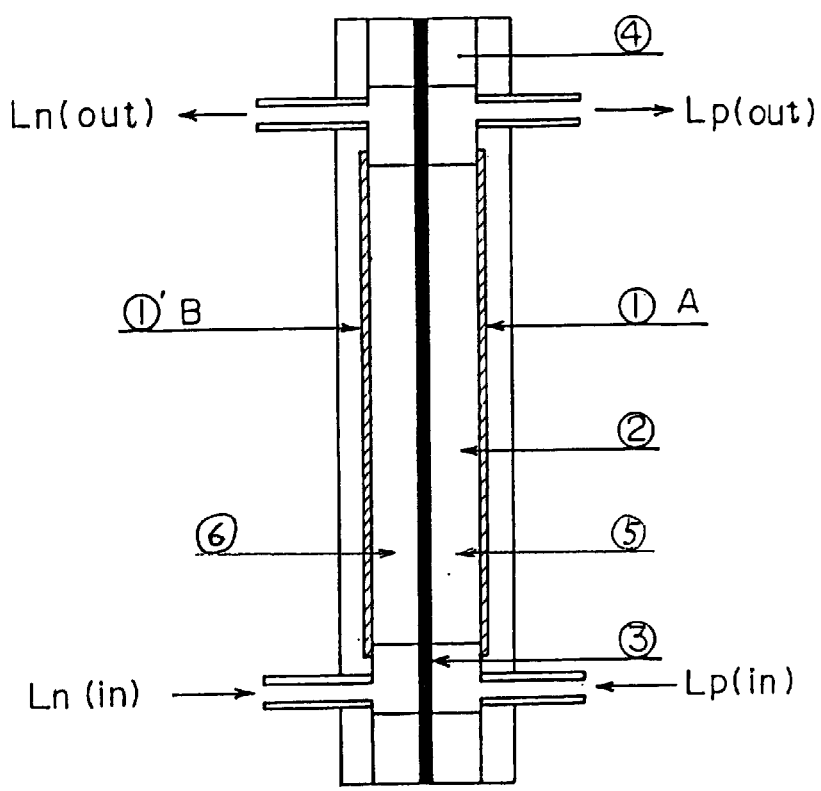
FIG. 1 is a schematic drawing of a single cell of the redox flow battery composing the battery of the present invention.

The redox flow type secondary battery of the present invention is characterized in that it can be charged and discharged while the electrolyte which migrates through the membrane over cycles of charge and discharge is returned through a pipe from the storage tank where the liquid increases to the other tank where the liquid decreases to keep the liquid levels in the storage tanks for the positive and negative electrolytes in a certain range.

In the redox flow type secondary battery, vanadium ions, sulfate ions, hydrogen ions, and water as a solvent migrate through the membrane in the electrolytic cell from one side to the other over the course of the charge and discharge reactions. For example, when a battery employing an anion exchange membrane is charged, anionic ions such as sulfate ions easily migrate through the membrane because the membrane has cation groups, but cationic ions such as vanadium ions are less likely to migrate through the membrane. At the same time, water as a solvent also migrates together with the migrating ions to the negative cell. When the battery is discharged, the ions migrate in the opposite direction and the electrolytes are, supposed to return to the initial state, but part of the liquid which has migrated to the negative cell does not return to the positive cell due to side reactions and the like and remains in the negative cell. In this case, the liquid in the negative cell increases. Similarly, when a cation exchange membrane is employed, the liquid in the positive cell increases by the reverse mechanism. As a result, the amounts and compositions of the positive and negative electrolytes change.

Because the amount of the active materials in the electrolytes is proportional to the battery capacity which can be stored especially in the case of a redox flow battery, a decrease in the electrolyte in the tank causes a decrease in the capacity of the battery and, when the electrolyte decreases to a certain level, the operation of the battery should be stopped in order to supply or readjust the electrolytes.

The battery of the present invention enables continuous operation for a longer period of time without stopping operation for the procedure of mixing solutions, by returning the electrolyte in an amount corresponding to the increased electrolyte through a pipe from the storage tank where the liquid increases to the storage tank where the liquid decreases to maintain the liquid level of each storage tank for the positive and negative electrolytes in a certain range while charge and discharge are conducted.

The changes in the amounts of the liquids in each storage tank for the positive and negative electrolytes are preferably within 25%, more preferably within 20%, even more preferably within 10%, especially preferably within 5%, and most preferably within 3% of the amounts at the time charge and discharge are started (the initial values). When the changes are over this range, for example over 25%, either of the positive or negative electrolyte substantially decreases, which creates imbalances in the amounts of the active materials in both electrolytes and substantially decreases the amount of electricity which can be stored, causing a disadvantage.

The method of returning the electrolyte from one storage tank to the other may be either returning the electrolyte forcedly through a pipe by a pump or the like or the so-called 'overflow' method in which the liquid level in either of the storage tanks for the positive or negative electrolytes is set higher than the other and the electrolyte is allowed to flow through a pipe connecting both tanks with the aid of the gravity difference between the liquid levels. Either a batch-wise method in which the increased liquid is returned at a certain interval or a continuous method in which the liquid is constantly returned may be used in either of the above-mentioned forced reflux and natural reflux.

Although the amounts of the liquids in the storage tanks for the positive and negative electrolytes can be adjusted to the same level at the beginning of charge and discharge in a battery of the present invention, the amount of the liquid in the storage tank where the liquid decreases is preferably set greater than that of the liquid in the storage tank where the liquid increases since the amounts and compositions of the electrolytes in the storage tanks for the positive and negative electrolytes change over the course of charge and discharge. In this case, the difference between the amounts of the electrolytes in the two storage tanks is preferably 40% or less, more preferably 30% or less, and even more preferably 20% or less of the average amount of the liquids in the two storage tanks.

The amount of the liquid in the storage tank where the liquid decreases is set greater than that of the liquid in the storage tank where the liquid increases in order to cancel the changes in the amounts of the liquids due to migration caused by charge and discharge as well as to maintain the ion composition of the electrolytes to a stabler state for a mild equilibrium. As mentioned above, when there is an appropriate difference between the amounts of the positive and negative electrolytes, charge and discharge are stabilized, but an excess electrolyte is useless and increases costs, and the less the difference between the amounts of the electrolytes, the more preferable it is for effective utilization of the electrolyte. In this connection, it is practical that the electrolytes are used in amounts within the above-mentioned range.

Furthermore, when the electrolyte is returned by the above-mentioned overflow method, the liquid level in the storage tank where the liquid increases is set higher beforehand than that in the other tank, and a liquid-refluxing pass is equipped for refluxing the liquids from the higher storage tank to the other tank with the aid of the difference between the liquid levels by gravity.

Specifically, the liquid levels in the storage tanks for the positive and negative electrolytes are preferably set according to the type of the membrane as follows.

When the membrane is an anion exchange membrane, the liquid level in the storage tank for the negative electrolyte is set higher than that in the storage tank for the positive electrolyte, and when the membrane is a cation exchange membrane, the liquid level in the storage tank of the positive electrolyte is set higher than that in the storage tank of the negative electrolyte. When the membrane is a multi-layered membrane obtained by laminating plural anion and cation exchange membrane layers, the liquid level in the storage tank for either of the positive or negative electrolyte where the liquid increases depending on the properties of the multi-layered membrane is set higher than that in the other storage tank. For example, when the membrane is a multi-layered membrane obtained by laminating plural anion and cation exchange membrane layers, it is preferable that the cation exchange membrane layer is disposed to be in contact with the positive cell and the liquid level in the storage tank for the positive electrolyte is set higher than that in the storage tank for the negative electrolyte.

When the liquid level in the storage tank for either of the positive or negative electrolyte is set higher than that in the other storage tank, the storage tank to be set higher may be disposed at a higher level than the other tank. Alternatively, both tank may be disposed at the same level and the corresponding tank may be narrowed to have a smaller cross-section to heighten the liquid level. In this case, the difference between the liquid levels in both storage tanks is preferably 1% or more and 40% or less, more preferably 2% or more and 30% or less, even more preferably 3% or more and 25% or less, and especially preferably 4% or more and 20% or less based on the average liquid level in the storage tanks.

When the liquid level in the storage tank for either of the positive or negative electrolyte is set higher than that in the other storage tank, the difference between the liquid levels is preferably 2 cm or more and 100 cm or less, more preferably 3 cm or more and 80 cm or less, even more preferably 5 cm or more and 60 cm or less, and especially preferably 7 cm or more and 50 cm or less, depending on the size and shape of both tanks.

For the same reason described for the case where there is a difference between the amounts of the liquids in both tanks, the difference between the liquid levels in both tanks should be equal to or below the above-mentioned upper limit. In addition, when the electrolyte is returned by the overflow method, the difference between the liquid levels in both tanks should be equal to or above the above-mentioned lower limit to facilitate smooth reflux of the electrolyte.

Both positive and negative electrolytes used for the battery of the present invention are aqueous solutions of vanadium. More specifically, the electrolyte is an aqueous solution of a vanadium salt such as vanadium sulfate and vanadyl sulfate in sulfuric acid with a vanadium ion concentration in this aqueous solution of 0.5 mol/l to 8 mol/l. The aqueous solution preferably has a vanadium concentration of 0.6 mol/l to 6.0 mol/l, more preferably 0.8 mol/l to 5.0 mol/l, even more preferably 1.0 mol/l to 4.5 mol/l, especially preferably 1.2 mol/l to 4.0 mol/l, and most preferably 1.5 mol/l to 3.5 mol/l. When the vanadium concentration is below 0.5 mol/l, the energy density of the resulting battery is low and, when the vanadium concentration is above 8.0 mol/l, the electrolyte has a higher viscosity, which increases the resistance of the battery cell and decreases the energy efficiency.

An aqueous solution of a vanadium salt in sulfuric acid is preferably used as the electrolyte and the concentration of sulfate ions is preferably 0.5 mol/l to 9.0 mol/l, more preferably 0.8 mol/l to 8.5 mol/l, even more preferably 1.0 mol/l to 8.0 mol/l, especially preferably 1.2 mol/l to 7.0 mol/l, and most preferably 1.5 mol/l to 6.0 mol/l.

The membrane used in the battery of the present invention is preferably an ion exchange membrane comprising an organic polymer. Either a cation exchange membrane or an anion exchange membrane may be used.

The cation exchange membrane includes those obtained by sulfonation of a styrene-divinylbenzene copolymer, by introducing a sulfonic acid group into a copolymer of tetrafluoroethylene and perfluorosulfonyl ethoxy vinyl ether, by copolymerizing tetrafluoroethylene and perfluorovinyl ether having a carboxyl group at a side chain, and by introducing a sulfonic acid group into an aromatic polysulfone copolymer.

The anion exchange membrane includes those obtained by introducing a chloromethyl group into a copolymer of styrene-divinylbenzene and aminating the resultant copolymer, by converting a copolymer of vinylpyridine-divinylbenzene into a quaternary pyridium, and by introducing a chloromethyl group into an aromatic polysulfone copolymer and aminating the resultant copolymer.

An ion exchange membrane which has ion exchange group layers obtained by laminating two or more cation and anion exchange group layers can be used. In this case, the cation exchange group layer is preferably disposed to be in contact with the positive electrolyte. In this case, a cation exchange group layer which comprises a fluorine-containing polymer having a cation exchange group, a styrene-based polymer having a cation exchange group, and those having a sulfonic acid group and/or a carboxylic acid group are used as the cation exchange group layer.

Furthermore, the fluorine-containing polymer having a cation exchange group is preferably a copolymer of tetrafluoroethylene and a fluorine compound represented by the following formula.

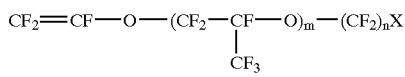

(wherein m is 0 or 1; n is an integer from 1 to 3; and X is a sulfonic acid group, a carboxylic acid group, or a group convertible to the groups)

The anion exchange group layer may be one which comprises an aromatic polysulfone-based polymer having an anion exchange group and which comprises a styrene-based polymer having an anion exchange group.

The ion exchange equivalents of the cation exchange group layer and the anion exchange group layer in the ion exchange membrane are preferably 0.3 (milliequivalent/gram dry resin) or more and 5.0 (milliequivalent/gram dry resin).

Although the positive electrolyte can contain a mixture of tetravalent and pentavalent vanadium ions or pentavalent vanadium ions alone in a charged state in the battery of the present invention, the concentration of pentavalent vanadium ions in the positive electrolyte at the completion of charge is 0.5 mol/l to 7.5 mol/l, preferably 0.6 mol/l to 5.5 mol/l, more preferably 0.8 mol/l to 4.5 mol/l, even more preferably 1.0 mol/l to 4.0 mol/l, especially preferably 1.2 mol/l to 3.8 mol/l, and most preferably 1.5 mol/l to 3.5 mol/l.

The ratio of pentavalent vanadium ions to the concentration of all the vanadium ions in the positive electrolyte at the completion of charge is preferably 50% or more and 100% or less, more preferably 60% or more and 99% or less, even more preferably 65% or more and 98% or less, especially of 70% or more and 97% or less, and most preferably 75% or more and 96% or less.

Although the positive electrolyte can contain a mixture of tetravalent and pentavalent vanadium ions, tetravalent vanadium ions alone, or a mixture of tetravalent and trivalent vanadium ions in a discharged state in the battery of the present invention, the concentration of tetravalent vanadium ions in the positive electrolyte at the completion of discharge is 0.5 mol/l to 7.5 mol/l, preferably 0.6 mol/l to 5.5 mol/l, more preferably 0.8 mol/l to 4.5 mol/l, even more preferably 1.0 mol/l to 4.0 mol/l, especially preferably 1.2 mol/l to 3.8 mol/l, and most preferably 1.5 mol/l to 3.5 mol/l.

The ratio of tetravalent vanadium ions to the concentration of all the vanadium ions in the positive electrolyte at the completion of discharge is preferably 50% or more and 100% or less, more preferably 60% or more and 99% or less, even more preferably 65% or more and 98% or less, especially of 70% or more and 97% or less, and most preferably 75% or more and 96% or less.

Furthermore, the ratio of trivalent vanadium ions to the concentration of all the vanadium ions in the positive electrolyte at the completion of discharge is preferably 30% or less, more preferably 25% or less, even more preferably 20% or less, especially of 10% or less, and most 5% or less.

Although the negative electrolyte can contain a mixture of trivalent and divalent vanadium ions or divalent vanadium ions alone in a charged state in the battery of the present invention, the concentration of divalent vanadium ions in the negative electrolyte at the completion of charge is 0.5 mol/l to 7.5 mol/l, preferably 0.6 mol/l to 5.5 mol/l, more preferably 0.8 mol/l to 4.5 mol/l, even more preferably 1.0 mol/l to 4.0 mol/l, especially preferably 1.2 mol/l to 3.8 mol/l, and most preferably 1.5 mol/l to 3.5 mol/l.

The ratio of divalent vanadium ions to the concentration of all the vanadium ions in the negative electrolyte at the completion of charge is preferably 50% or more and 100% or less, more preferably 60% or more and 99% or less, even more preferably 65% or more and 98% or less, especially of 70% or more and 97% or less, and most preferably 75% or more and 96% or less.

Although the negative electrolyte can contain a mixture of trivalent and divalent vanadium ions, divalent vanadium ions alone, or a mixture of tetravalent and trivalent vanadium ions in a discharged state in the battery of the present invention, the concentration of trivalent vanadium ions in the negative electrolyte at the completion of discharge is 0.5 mol/l to 7.5 mol/l, preferably 0.6 mol/l to 5.5 mol/l, more preferably 0.8 mol/l to 4.5 mol/l, even more preferably 1.0 mol/l to 4.0 mol/l, especially preferably 1.2 mol/l to 3.8 mol/l, and most preferably 1.5 mol/l to 3.5 mol/l.

The ratio of trivalent vanadium ions to the concentration of all the vanadium ions in the negative electrolyte at the completion of discharge is preferably 50% or more and 100% or less, more preferably 60% or more and 99% or less, even more preferably 65% or more and 98% or less, especially of 70% or more and 97% or less, and most preferably 75% or more and 96% or less.

Furthermore, the ratio of trivalent vanadium ions to the concentration of all the vanadium ions in the negative electrolyte at the completion of discharge is preferably 30% or less, more preferably 25% or less, even more preferably 20% or less, especially of 10% or less, and most 5% or less.

The cell reaction in the present invention will be illustrated with reference to an all vanadium redox flow type battery. The single cell has a structure in which two current collecting electrodes 1A and 1B and two liquid-permeable porous electrodes 2 disposed on both sides of the membrane 3 are configured as shown in FIG. 1, and these members are sandwiched by the two current collecting electrodes 1A and 1B. One space partitioned by the membrane is used as a positive cell 5, the other space as a negative cell 6, and the width of the cells is maintained by means of an appropriate spacer 4. A positive electrolyte comprising $V^{4+}/V^{5+}$ and a negative electrolyte comprising $V^{3+}/V^{2+}$ are circulated to the positive cell 5 and the negative cell 6, respectively, to form a redox battery. In the redox flow type battery, $V^{4+}$ is oxidized to $V^{5+}$ to release an electron in the positive cell 5 during charge. The released electron is supplied to the negative cell 6 through an external circuit. The supplied electron reduces $V^{3+}$ to $V^{2+}$ in the negative cell 6. Over the course of this oxidation reduction reaction, the positive cell 5 has excess hydrogen ions H+ whereas the negative cell 6 runs short of hydrogen ions $H^+$. The membrane 3 allows the excess hydrogen ions H+ in the positive cell 5 to selectively transfer to the negative cell 6 to maintain electrical neutrality. The reverse reaction proceeds during discharge.

In the above-mentioned cell reaction, the energy efficiency, the current efficiency, and the potential efficiency are shown by the formulae (1), (2), and (3), respectively.

$$\text{Energy efficiency}(\%) = \frac{\text{Discharged electric energy}}{\text{Charged electric energy}} \times 100 \quad (1)$$

$$\text{Current efficiency}(\%) = \frac{\text{Amount of discharged current}}{\text{Amount of charged current}} \times 100 \quad (2)$$

$$\text{Voltage efficiency}(\%) = \frac{\text{Power efficiency}}{\text{Current efficiency}} \times 100 \quad (3)$$

The charged and discharged electric energies depend on the internal resistance of the battery cell, the ion selectivity of the membrane against vanadium ions, sulfate ions, hydrogen ions, and the like and the shunt current loss (the loss of current leaking outside through the electrolyte). Lower internal resistance improves the potential efficiency. Improved ion selectivity and reduced shunt current loss improve the current efficiency.

EXAMPLES

The present invention will be next illustrated with reference to suitable examples.

Example 1 and Comparative Example 1

A redox flow battery of the present invention was formed which comprised a cell comprising electrodes and a membrane and storage tanks for positive and negative electrolytes, wherein an anion exchange membrane was used, and the increased electrolyte, which had migrated through the membrane from the storage tank for the positive electrolyte to the storage tank for the negative electrolyte over the course of charge and discharge, was pumped back to the storage tank for the positive electrolyte through a pipe approximately every 30 cycles to keep the change in the amounts of the solutions in both storage tanks in a certain range. The battery was charged and discharged under the following conditions.

That is, aqueous solutions of vanadium in sulfuric acid were used as the electrolytes, and 0.15 liter and 0.12 liter of the electrolytes were used for the storage tanks of the positive and negative electrolytes, respectively, and the resultant redox flow battery of the present invention was charged for two hours and discharged for two hours, four hours in total counted as one cycle of charge and discharge, and the battery was subjected to 30 cycles continuously under the following conditions. When charge and discharge were stopped after the 30 cycles, the electrolyte in the storage tank for the negative electrolyte was found to have increased to 0.13 liter. The increased electrolyte was pumped back to the storage tank for the positive electrolyte and 30 cycles of charge and discharge were repeated, and a total of 120 cycles of charge and discharge was conducted for 480 hours. When the 120 cycles of charge and discharge were finished, the battery was evaluated for the battery properties according to the following test method.

As Comparative Example 1, the battery was subjected to 120 cycles of continuous charge and discharge under the same charge and discharge conditions except that the so-called liquid mixing procedure was taken every 30 cycles in which the electrolytes in the storage tanks for the positive and negative electrolytes were mixed to homogeneity and the mixture was returned to the two tanks in equal portions and the positive and negative electrolytes were prepared by passing an electric current therethrough. The battery was evaluated in the same manner according to the following test method.

Charge and Discharge Conditions:

A polysulfone-based anion exchange membrane was used as an ion exchange membrane for a battery cell and liquid-permeable porous carbon electrodes were used as electrodes. Aqueous solutions of vanadium in sulfuric acid with vanadium concentrations of 1.8 mol/l were used as positive and negative electrolytes. Continuous charge and discharge were carried out with the battery cell voltage in the range of 1.30 to 1.60 V. The temperature was kept constant at 35° C.

Test Method:

The battery was evaluated for cell performance (current efficiency, energy efficiency, and voltage efficiency), the change in the cell performance compared to that at the beginning of operation (the rate of the change relative to the initial state), and the change of capacity (discharged electric energy relative to the initial electric energy as a percent) after the cell was subjected to the 120 cycles of continuous charge and discharge under the above-mentioned conditions in the method of Example 1 or Comparative Example 1. The results are shown in Table 1 and Table 2.

Example 2

A redox flow battery of the present invention which employed the same anion exchange membrane as in Example 1 as a membrane was formed in the same manner as in Example 1 except that the liquid level in the storage tank for the negative electrolyte was set 10 cm higher than that in the storage tank for the positive electrolyte and a pipe was provided at the liquid level in the storage tank for the negative electrolyte for returning the electrolyte to the storage tank for the positive electrolyte so that the electrolyte, which had migrated through the membrane from the positive cell to the negative cell and further to the storage tank for the negative electrolyte over the course of charge and discharge, was returned to the storage tank for the positive electrolyte through the refluxing pipe with the aid of the gravity difference between the liquid levels. The battery was subjected to about 120 cycles of continuous charge and discharge under the following conditions while the liquid levels in both storage tanks were kept automatically.

Charge and Discharge Conditions:

A polysulfone-based anion exchange membrane was used as an ion exchange membrane for a battery cell and liquid-permeable porous carbon electrodes were used as electrodes as in Example 1. Furthermore, aqueous solutions of vanadium in sulfuric acid with vanadium concentrations of 1.8 mol/l were used as positive and negative electrolytes. Continuous charge and discharge were carried out with the battery cell voltage in the range of 1.30 to 1.60 V. The temperature was kept constant at 35° C.

The battery was evaluated for battery characteristics (current efficiency, energy efficiency, and voltage efficiency), the change in the battery characteristics compared to that at the beginning of operation (the rate of the change relative to the initial state), and the change of a discharged electric energy (discharged electric energy relative to the initial electric energy as a percent) as in Example 1, after the cell was subjected to the 120 cycles of continuous charge and discharge. The results are shown in Table 1 and Table 2.

TABLE 1

|  | Current efficiency (%) | Energy efficiency (%) | Voltage efficiency (%) |
| --- | --- | --- | --- |
| Comparative Example 1 (liquid mixing method) | 97.0 | 79.6 (Δ2.4) | 82.1 (Δ2.3) |
| Example 1 (batchwise liquid adjusting method) | 99.2 | 83.2 (Δ0.4) | 83.9 (Δ1.4) |
| Example 2 (overflow method) | 99.2 | 82.6 (Δ+0.2) | 83.2 (Δ0.6) |

TABLE 2

| Experiment method | Discharged electric power relative to the initial state (%) |
| --- | --- |
| Comparative Example 1 (liquid mixing method) | 81.2 |
| Example 1 (batchwise liquid adjusting method) | 91.5 |
| Example 2 (overflow method) | 94.2 |

As shown in Table 1 and Table 2, the redox flow batteries of the present invention (Examples 1 and 2) showed superior energy efficiency, current efficiency, and voltage efficiency to the conventional liquid mixing method. The new system of the present invention allowed a lesser degree of the efficiency and battery capacity deterioration in the course of the continuous charge/discharge cycling compared with those of the liquid mixing method as shown in the values in parentheses in Table 1.

As shown in Table 2, the discharged electric power of the batteries of the present invention decreased to a lesser degree relative to the initial state after the 120 cycles than that of the liquid mixing method, which means the characteristics of the electrolyte in the battery of the present invention decreased little and 120 cycles of continuous charge and discharge was possible.

The redox flow type battery of the present invention can be continuously charged and discharged with good battery characteristics for a longer period of time even if the electrolyte migrates due to the repeated charge and discharge and its discharged electric energy decreases little after a long-term operation.

Industrial Applicability

The redox flow type battery of the present invention can be charged and discharged repeatedly with a high efficiency for a longer period of time and is useful as a secondary battery for temporary storage of electric power.

What is claimed is:

1. A redox flow type secondary battery which is a liquid-circulating battery comprising a battery cell and storage tanks for positive and negative electrolytes, wherein the battery cell is separated by a membrane to provide a positive cell and a negative cell, each cell having a liquid-permeable porous electrode disposed therein, and the positive and negative electrolytes are passed and circulated from the storage tanks for the positive and negative electrolytes to the positive and negative cells, respectively, to conduct an oxidation-reduction reaction to charge and discharge the battery, characterized in that the amount of the liquid in the storage tank where the liquid decreases over cycles of charge and discharge is set greater than that of the liquid in the other storage tank beforehand, and the positive and negative electrolytes are sulfuric acid aqueous solutions with vanadium ion concentrations of 0.5 mol/l to 8 mol/l and the electrolyte which migrates through the membrane over cycles of charge and discharge is returned from the storage tank where the liquid increases to the storage tank where the liquid decreases in order to keep the change in the amounts of the positive and negative electrolytes in a certain range while charge and discharge are carried out.

2. The redox flow type secondary battery according to claim 1, wherein the relationship between the amounts in the storage tanks for the positive and negative electrolytes and the type of the membrane satisfies one of the conditions (a) to (c):

(a) The membrane is an anion exchange membrane and the amount of the liquid in the storage tank for the positive electrolyte is set greater than that of the liquid in the storage tank for the negative electrolyte;

(b) The membrane is a cation exchange membrane and the amount of the liquid in the storage tank for the negative electrolyte is set greater than that of the liquid in the storage tank for the positive electrolyte; or (c) The membrane is a multi-layered membrane obtained by laminating plural anion and cation exchange membrane layers and the amount of the liquid in the storage tank for either of the positive or negative electrolyte where the liquid decreases depending on the properties of the multi-layered membrane is set greater than that of the liquid in the other storage tank.

3. The redox flow type secondary battery according to claim 1 or 2, wherein the difference between the liquid levels in the two storage tanks is in the range of from 1% or more to 40% or less of the average amount of the liquids in the two storage tanks.

4. The redox flow type secondary battery according to claim 1, wherein the liquid level in the storage tank where the liquid increases over cycles of charge and discharge is set higher beforehand than that in the other tank and a liquid-refluxing pass is equipped for refluxing the liquid from the higher storage tank to the other tank with the aid of the gravity difference between the liquid levels.

5. The redox flow type secondary battery according to claim 4, wherein the relationship between the liquid levels in the storage tanks for the positive and negative electrolytes and the type of the membrane satisfies one of the conditions (1) to (3):

(1) The membrane is an anion exchange membrane and the liquid level in the storage tank for the negative electrolyte is set higher than that in the storage tank for the positive electrolyte;

(2) The membrane is a cation exchange membrane and the liquid level in the storage tank for the positive electrolyte is set higher than that in the storage tank for the negative electrolyte; or (3) The membrane is a multi-layered membrane obtained by laminating plural anion and cation exchange membrane layers and the liquid level in the storage tank for either of the positive or negative electrolyte where the liquid increases depending on the properties of the multi-layered membrane is set higher than that in the other storage tank.

6. The redox flow type secondary battery according to claim 4 or 5, wherein the membrane is multi-layered membrane obtained by laminating plural anion and cation exchange membrane layers, and the cation exchange membrane layer faces the positive cell, and the liquid level in the storage tank for the positive electrolyte is set higher than that in the storage tank for the negative electrolyte.

7. The redox flow type secondary battery according to claim 4, wherein the difference between the liquid levels in two storage tanks is in the range of from 2 cm or more to 100 cm or less.

8. The redox flow type secondary battery according to claim 1, wherein the positive and negative electrolytes are sulfuric acid aqueous solutions of vanadium and the concentrations of sulfate ions in the electrolytic solutions are 0.5 mol/l to 9.0 mol/l.

* * * * *